Sept. 9, 1958 J. ANDON ET AL 2,851,022
POPPET VALVE OPERATING MECHANISM
Filed Nov. 9, 1954 2 Sheets-Sheet 1

INVENTORS
Jerar Andon,
Boris John Mitchell &
BY Ralph E. Schwind
J. C. Thorpe
ATTORNEY United States Patent Office 2,851,022
Patented Sept. 9, 1958

2,851,022

POPPET VALVE OPERATING MECHANISM

Jerar Andon, Royal Oak, and Boris J. Mitchell and Ralph E. Schwind, Birmingham, Mich., assignors to General Motors Corporation, Detroit, Mich., a corporation of Delaware Application November 9, 1954, Serial No. 467,732

7 Claims. (Cl. 123—90)

This invention relates to internal combustion engines and like devices having slidably guided poppet valves, plungers, etc., and particularly to means for reciprocably operating such slidably guided parts.

In internal combustion engines of the overhead valve type, for example, in which the valves are actuated in the valve opening direction by rockers and returned to the closed position after each opening stroke by springs reacting against a fixed part of the engine, there has long been an objectionable valve "squawk" noise experienced during engine operation. This valve "squawk" is to be distinguished from the so-called "clicking" noise resulting from the taking up of the valve lash or operating clearances in the valve operating mechanism, and which is avoidable through the use of self adjusting valve lifters. We have found valve "squawk," on the other hand, to be caused by sticking of the valve stems in their guides. While elimination of this sticking condition might seem easily remedied by better lubrication of the stem in the guide, such a course is itself objectionable since the amount of additional lubrication necessary therefor would result in the lubricant being drawn into the engine combustion chamber where it would burn and create a smoky exhaust, not to mention severely adding to the engine oil consumption rate. Also, in the case of exhaust valves a minimum of lubrication is preferred because of their high operating temperatures tending to burn the oil on the sliding surfaces of the valve stem and guide.

In attacking the probelm we have found that sticking of the valve stems and the consequent "squawk" noise can be successfully eliminated by isolating the valve stem of lateral forces tending to act on it during reciprocation. Such lateral thrust forces are produced by coil return springs which are out of square or for other reasons do not flex coaxially of the valve, and by the horizontal component of the valve rocker movement as it oscillates about its axis which is necessarily spaced a considerable distance to one side of the valve stem. It is accordingly the principal object of this invention to provide means for imparting opening and closing movements to a poppet valve which will serve to isolate the valve from all lateral force components.

It is also desirable that poppet valves rotate axially in operation to enable them to develop a uniform seating pattern, and thereby avoid carbon deposits and uneven wear on their seating surfaces which tend to interfere and cause inefficient dissipation of heat to the seats, and which in aggravated instances results in burning and otherwise brings about deterioration of the valve heads and their seats. It is accordingly a further object of this invention to provide a return spring retainer and actuator thrust transmitting means for a poppet valve in which the valve is rendered substantially free to rotate during reciprocation.

The means by which these and other objects of the invention are accomplished will be more readily understood from the following description, having reference to the drawings, wherein.

Figure 1:
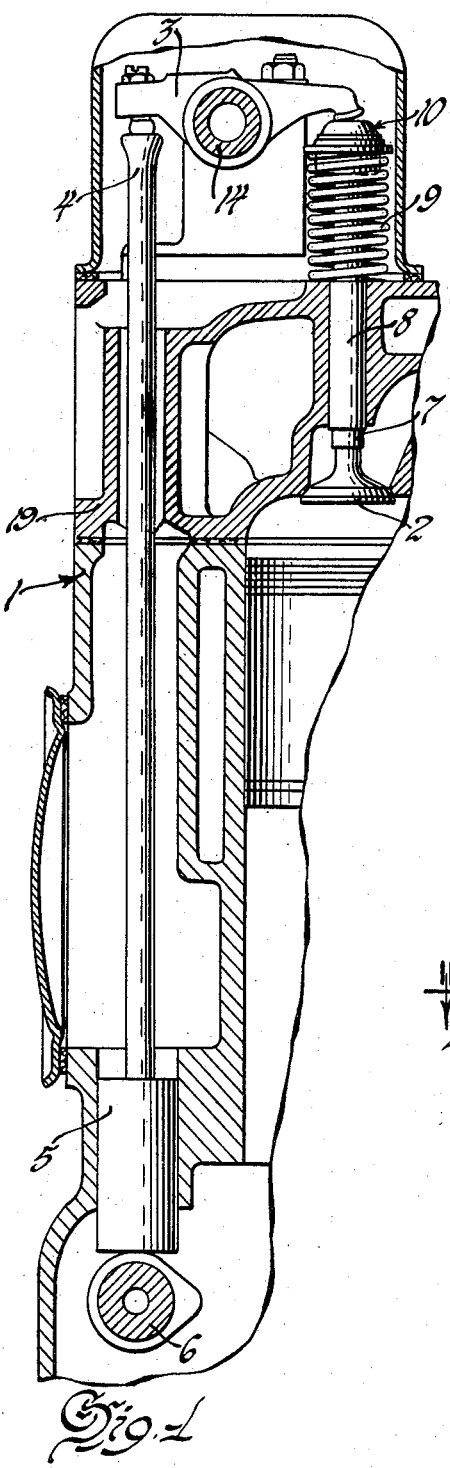
Figure 1 is a transverse view, partly in section and partly in elevation, through a portion of an internal combustion engine having a poppet valve operating mechanism embodying the features of the invention.
Figure 2:
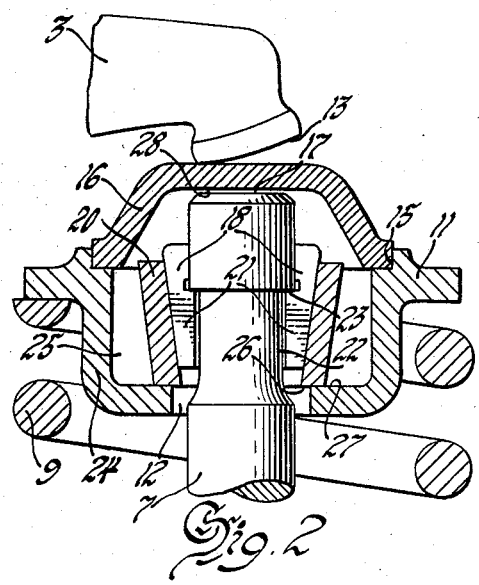
Figure 2 is an enlarged fragmentary view similar to Figure 1 showing the parts of the valve spring retaining and rocker thrust transmitting means in greater detail.

Referring now in detail to the drawings, and first to Figures 1 and 2 thereof, the numeral 1 designates generally an internal combustion engine having a poppet valve 2 reciprocably mounted in the engine cylinder head 19 and operated by a valve gear including a rocker 3, push rod 4, tappet 5 and engine driven cam 6, all of conventional design. The valve has a stem 7 slidably guided by a bushing 8 fixed in the cylinder head 19, and biasing the valve to its closing position (shown) is a coil return spring 9 embracing the valve stem and reacting at one end against the cylinder head.

Means generally designated by the numeral 10 forms a connection between the other end of the spring 9, the valve stem 7 and the valve end of the rocker 3. This means, as best shown in Figure 2, serves both to isolate the valve stem from any movements laterally thereof on the part of the rocker 3 or spring 9, and to substantially relieve the valve stem of all forces tending to restrain its axial rotation during reciprocation, and particularly during the valve opening stroke. As shown, a washer 11 embraces the valve stem and provides a seat for the upper end of the spring 9. The opening 12 in this washer is made large enough so that its radial clearance with the periphery of the stem will accommodate the horizontal component of movement of the valve driving surface 13 of the rocker incident to its oscillatory movement about the rocker bearing 14 (Figure 1). Seated on the washer 11 and preferably in a counterbore 15 thereof is a cap member 16 which overlies the end face 17 of the valve stem. Abutment means for the washer 11 is provided on the valve stem to transmit the valve spring thrust from the washer to the stem in effecting the valve closing movement following each lift stroke of the cam 6. This abutment means is removable from the stem and includes the conventional split wedge section locks 18 and a tapered keeper sleeve 20 which retains the locks snugly embraced on the stem. Supplementing this wedging engagement are radially extending tongue portions 21 on the locks which are received in an annular groove 22 formed in the periphery of the stem and terminating in a shoulder 23 forming a positive stop for the tongue portions.

Outwardly of the opening 12 the washer is flanged upwardly to form side walls 24 of an enclosure 25 about the sleeve 20 and the cap member 16. This cap member, which may be dished as shown, forms a continuation of the enclosure about the sides and end face 17 of the valve stem. Since the abutment means including the locks 18 and sleeve 20 are self-retained on the stem, no lateral support therefor is required or provided by either the washer 11 or the cap member 16, and ample clearance can be provided between the washer walls 24 and the sleeve 20, and between the cap member 16 and the sleeve 20, to accommodate the full lateral movement of the washer and cap member with the rocker surface 13. The lower end face 26 of the sleeve 20 extends sufficiently laterally of the stem to always overlie the opposing surface 27 of the washer throughout the range of lateral movements of the washer relative to the stem. A predetermined clearance 28 (of the order of .002 inch) is provided between the cap member 16 and the valve stem end face 17 when the valve is closed and the sleeve face 26 and washer surface 27 are in abutment with each other. This clearance 28 is taken up during the initial portion of each valve opening movement of the rocker 3 prior to any positive driving movement being imparted to the valve by the rocker. As a result, the valve stem is relieved of its spring pressure during each valve opening stroke, and after the clearance 28 is taken up the valve merely follows the downward movement of the cap member, without any lateral forces being transmitted to the stem other than that incident to frictional engagement of the cap member with the stem end face 17. As a result, the stem is substantially isolated from all forces acting laterally thereof and tending to cause its binding and sticking in the valve guide 8, and is also relieved of substantially all frictional forces tending to restrain its axial rotation during valve opening. On the return stroke, the washer acts under the thrust of the spring against the sleeve 26 and the locks 21 to move the valve to its closed position, while the cap member 16 operates against the surface 13 of the rocker in returning the latter to its valve closed position.

Figure 3:
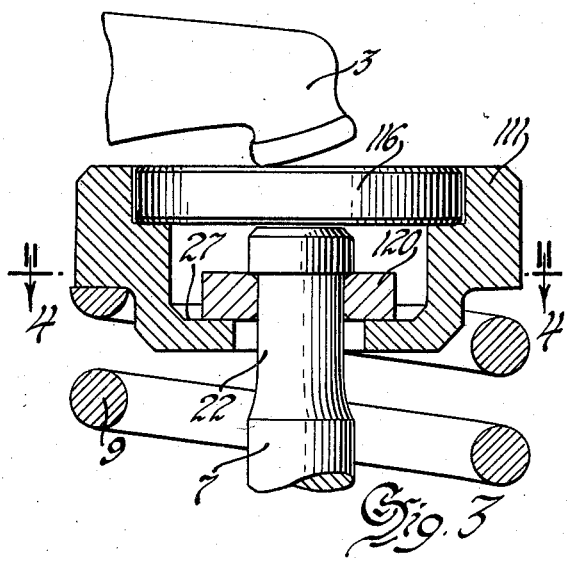
Figures 3, 5 and 6 are views similar to Figure 2, but showing different structural variations of the invention.
Figure 4:
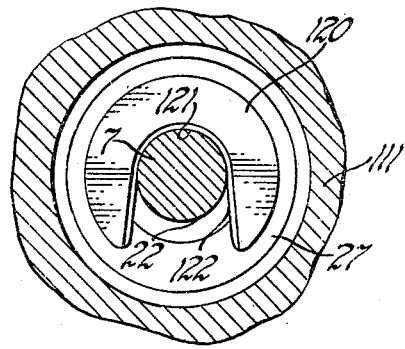
Figure 4 is a sectional view taken substantially on line 4—4 of Figure 3.

The Figure 3 construction operates in the same manner as that previously described and differs in structure therefrom essentially only in the washer abutment means and the cap member. The abutment means for this form consists simply of a U-shaped key 120 whose internal periphery 121 has a close fit with the bottom of the stem groove 22 and extends circumferentially thereof somewhat more than 180° between the radially inner ends of the tapered throat 122. The key 120 is thereby self-retained laterally of the stem, and its removal and installation on the stem is effected by slightly expanding the throat with a suitable tool (not shown) to permit the grooved portion of the stem to pass through the throat. For greater simplicity of manufacture the cap member 116 is made as a flat disk, rather than dished as in the case of the previously described cap 16. The washer 111 does not differ significantly in design from that of the previously described washer 11.

Figure 5:
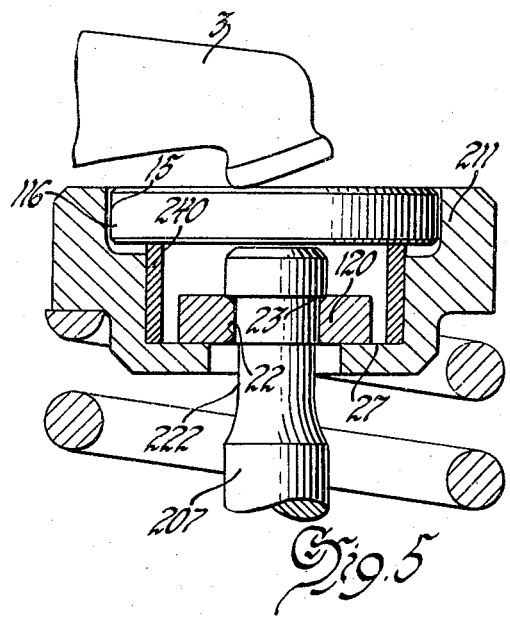

Figure 5 shows two further refinements in construction which simplify the installation and removal of a U-shaped valve keeper 120, and reduce the manufacturing cost of the washer 211. The valve stem 207 in this form has the bottom of its groove 22 relieved annularly below the keeper 120, as shown at 222. With this arrangement the keeper 120 can be inserted and removed over the relieved portion 222 of the groove, and when positioned against the shoulder 23 the restricted throat prevents its lateral displacement. Instead of the cap member 116 being directly seatable on the bottom of the counterbore 15 it rests on a bushing 240 which, in turn, seats on the washer thrust surface 27. It will be noted that ample radial clearance is provided between the bushing 240 and the keeper 120 to accommodate full lateral movement of the washer and cap member with the rocker 3.

Figure 6:
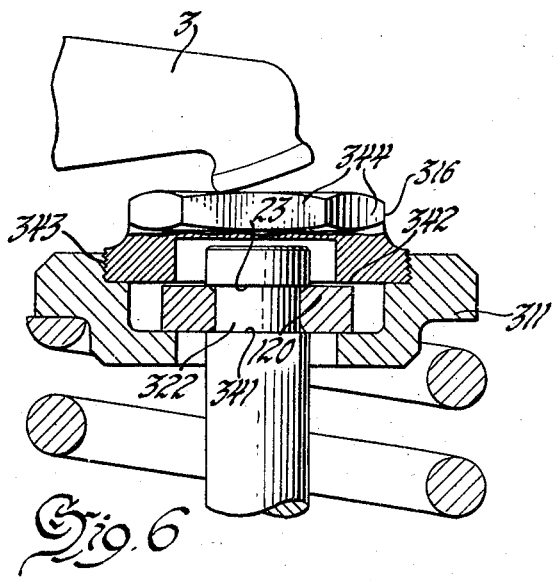

In the Figure 6 construction the valve stem groove 322 terminates at its valve head end with a shoulder 341 which cooperates with the upper shoulder 23 in positively locking the keeper 120 against movement in either direction longitudinally of the valve stem. Also in this form, the predetermined clearance taken up between the cap member and the valve stem during the initial valve opening stroke is provided at 342 between the cap member 316 and the keeper 120. The operation is otherwise the same as that of the previously described forms of Figures 2, 3 and 5, and has some disadvantage with respect to those in that the thrust force acting between the cap member and keeper are at a larger radius from the valve stem and hence less able to isolate the stem from the lateral component of rocker movement and friction tending to restrain valve rotation. Some advantage, however, is gained in reducing the requirements for maintaining close manufacturing tolerances, since the width of the groove 322 and the thickness of the keeper 120 are the only dimensions requiring close control. Maintenance of the clearance 342 can be periodically adjusted as necessary by varying the relative axial positions of the cap member and washer at their threaded connection 343. Wrench flats 344 are provided on the upper end of the cap member 316 for this purpose.

It is appreciated that various further modifications in the shape and disposition of the parts will readily suggest themselves to persons skilled in the art without departing from the invention as embraced in the following claims.

We claim:

1. In combination with a poppet valve and a valve operating rocker, means for isolating the valve from substantially all lateral thrust transmission from the rocker during valve reciprocation, said means including a member slidably interposed in thrust transmitting relation between the valve and rocker and having freedom to slide laterally on the valve throughout the range of rocker movement laterally of the valve.

2. In combination with a poppet valve and a rocker and spring operative to alternately open and close the valve, respectively, means drivably connecting the rocker to the spring and to the valve including a washer thrustably engaging the spring and a member interposed between the rocker and washer, a seat for the valve, abutment means on the valve limiting spring urged movement of the washer relative to the valve, said washer and member being movable laterally of the valve and abutment means throughout the full range of lateral movement of the rocker relative to the valve, said member and valve having slidably engageable thrust surfaces.

3. In a poppet valve operating mechanism, a valve stem, a guide slidably supporting the stem, stem reciprocating means including a return spring, an arm having a surface movable against and with the spring about an axis laterally spaced from the stem, and thrust transmitting means between said arm surface, spring and stem effective to substantially isolate the stem from movements of the spring and arm in directions laterally of the stem, said thrust transmitting means including a keeper operatively fixed to the stem, a washer embracing the stem and thrustably engageable with the keeper and the spring, and a member thrustably spacing the washer from said arm surface, said washer and member having freedom for at least as extensive movement laterally of the stem and keeper as the component of movement of said arm surface laterally of the stem.

4. In a device for transmitting return spring opposed movement to a poppet valve from a valve actuator whose operative motion has a substantial component laterally of the direction of valve opening movement, a return spring retaining washer having its axial opening of a size accommodating full lateral movement of the washer with the actuator relative to the valve, a first surface on said washer facing in one axial direction thereof for seating the return spring, a second surface on said washer facing in the opposite axial direction, a keeper having means adapted to interengage and positively drive the valve in said opposite axial direction and a surface facing in said one axial direction and overlying said washer second surface in all relative positions thereof laterally of the valve, and a member seated on said washer for transmitting return spring opposed movement thereto from the valve actuator, said member having a valve engageable surface spaced a distance axially of said washer second surface such that a predetermined axial clearance exists between said member and the valve when said washer second surface and keeper surface are in abutment with each other.

5. In a device for transmitting return spring opposed movement to a poppet valve from a valve actuator whose operative motion has a substantial component laterally of the direction of valve opening movement, a return spring retaining washer having its axial opening of a size accommodating full lateral movement of the washer with the actuator relative to the valve, a surface on said washer facing in one axial direction thereof for seating the return spring, said washer having a counterbore facing in the opposite axial direction and forming a shoulder disposed radially inward of said surface, a keeper within said counterbore, said counterbore being of a diameter accommodating full lateral movement of the washer with the actuator relative to the keeper, said keeper having means adapted to interengage and positively drive the valve in said opposite axial direction and a surface facing in said one axial direction and overlying said shoulder in all operative positions of the washer laterally of the valve, and a member seated on said washer surface and forming a closure for the open end of said counterbore, said member having a valve engageable surface spaced a distance axially of said shoulder such that a predetermined axial clearance exists between said member and the valve when said keeper surface is in abutment with the shoulder.

6. In combination with a poppet valve including a valve head and a stem, a guide slidably supporting the stem for reciprocation, a valve actuator with a stem facing surface having movement both longitudinally and laterally of the stem during valve reciprocation, a valve return spring operatively connected to the guide, means thrustably interposed between the spring and the actuator including a spring retaining washer embracing the stem and a cap member spacing said washer and actuator surface apart, and abutment means on the stem for receiving the spring thrust from the washer, said washer and cap member forming an enclosure about the abutment means and the actuator end of the stem, said abutment means and stem having lateral clearance within the enclosure accommodating full lateral movement of the washer and cap member with said actuator surface, said abutment means including a keeper having a washer engageable surface of sufficient radial extent to overlie the inner marginal extremities of the washer throughout the range of washer movements laterally of the stem.

7. In combination with a poppet valve to be operated by an actuator whose operative motion has a substantial component laterally of the valve opening direction, said valve having a valve head and a reciprocably guided stem extending therefrom, said stem having an annular groove in its peripheral surface terminating at one end in a shoulder facing the head end, valve return spring retaining means including a washer embracing the stem and washer abutment means between the washer and said shoulder, the radially inner extremities of said washer having clearance with the stem accommodating full lateral movement of the washer with the actuator, said abutment means having a portion extending a sufficient distance into and circumferentially of the groove to maintain an operable thrust transmitting connection between the stem and washer in all laterally displaced positions of the washer relative to the stem, and a cap member seated on the washer for transmitting thrust between the washer and the valve actuator, said washer and cap member defining an enclosure about the extended end of the stem and the abutment means with freedom for movement laterally of the stem at least equal to the lateral component of motion of the valve actuator.

References Cited in the file of this patent

UNITED STATES PATENTS

| 2,142,224 | Turlay | Jan. 3, 1939 |
| 2,165,239 | Douglas et al. | July 11, 1939 |
| 2,590,719 | MacPherson | Mar. 25, 1952 |
| 2,647,501 | Rich | Aug. 4, 1953 |
| 2,674,985 | Carlin | Apr. 13, 1954 |
| 2,705,483 | Temple | Apr. 5, 1955 |
| 2,707,462 | Kirkpatrick et al. | May 3, 1955 |

OTHER REFERENCES

S. A. E. Journal August 1950, vol. 58, No. 8, p. 148.